United States Patent
Zhang et al.

(10) Patent No.: US 10,969,964 B2
(45) Date of Patent: Apr. 6, 2021

(54) METHOD, DEVICE, AND COMPUTER PROGRAM PRODUCT FOR PARALLEL DATA TRANSMISSION USING MACHINE LEARNING TO DETERMINE NUMBER OF CONCURRENCIES AND DATA SLICE SIZE

(71) Applicant: EMC IP Holding Company LLC, Hopkinton, MA (US)

(72) Inventors: Yuting Zhang, Chengdu (CN); Chao Lin, Chengdu (CN); Fei Peng, Chengdu (CN)

(73) Assignee: EMC IP Holding Company LLC, Hopkinton, MA (US)

(*) Notice: Subject to any disclaimer, the term of this patent is extended or adjusted under 35 U.S.C. 154(b) by 21 days.

(21) Appl. No.: 16/555,226

(22) Filed: Aug. 29, 2019

(65) Prior Publication Data
US 2021/0019047 A1    Jan. 21, 2021

(30) Foreign Application Priority Data
Jul. 19, 2019   (CN) .......................... 201910657308.6

(51) Int. Cl.
*G06F 3/06*   (2006.01)
*G06N 20/00*  (2019.01)

(52) U.S. Cl.
CPC .............. *G06F 3/061* (2013.01); *G06F 3/065* (2013.01); *G06F 3/0619* (2013.01); *G06F 3/0683* (2013.01); *G06N 20/00* (2019.01)

(58) Field of Classification Search
CPC ........ G06F 3/061; G06F 3/0619; G06F 3/065; G06F 3/0683; G06N 20/00
See application file for complete search history.

(56) References Cited

U.S. PATENT DOCUMENTS

| | | | |
|---|---|---|---|
| 7,924,719 B2* | 4/2011 | Curtis | H04L 69/16 370/230.1 |
| 9,391,911 B1* | 7/2016 | Anderson | H04L 1/1628 |
| 2018/0097740 A1* | 4/2018 | Reddy | H04W 24/08 |
| 2018/0302297 A1* | 10/2018 | Zhang | H04L 41/0823 |

* cited by examiner

*Primary Examiner* — Sean D Rossiter
(74) *Attorney, Agent, or Firm* — Ryan, Mason & Lewis, LLP

(57) ABSTRACT

A method, a device, and a computer program product for parallel data transmission are provided in embodiments of the present disclosure. The method includes obtaining attributes of data to be transmitted from a first storage device to a second storage device and a network condition between the first storage device and the second storage device. The method also includes determining a number of concurrencies and a data slice size for use in parallel transmission of the data based on the attributes of the data and the network condition, and transmitting the data in parallel between the first storage device and the second storage device using the determined number of concurrencies and the data slice size. In embodiments of the present disclosure, during parallel data transmission, the appropriate number of concurrencies and data slice size can be selected according to attributes of data to be transmitted and an actual network condition.

20 Claims, 4 Drawing Sheets

METHOD, DEVICE, AND COMPUTER PROGRAM PRODUCT FOR PARALLEL DATA TRANSMISSION USING MACHINE LEARNING TO DETERMINE NUMBER OF CONCURRENCIES AND DATA SLICE SIZE

RELATED APPLICATION(S)

The present application claims priority to Chinese Patent Application No. 201910657308.6, filed Jul. 19, 2019, and entitled "Method, Device, and Computer Program Product for Parallel Data Transmission," which is incorporated by reference herein in its entirety.

FIELD

Embodiments of the present disclosure generally relate to the field of data storage, and in particular, to a method, a device, and a computer program product for parallel data transmission.

BACKGROUND

A storage system refers to a system consisting of various storage devices for storing programs and data, hardware devices for controlling components and managing information scheduling, and various types of software, generally capable of storing a large amount of data. A data backup technology is usually used in the storage system to ensure the security of data storage. A redundant array of independent disks is a data backup technology that can combine a plurality of independent physical disks in different ways into an array of disks (i.e., a logical disk), thereby providing higher storage performance and higher reliability than a single disk.

Data transmission is a key indicator of modern data protection solutions, especially in large-scale data sets. The efficiency of data transmission is an important factor in data backup, data replication, disaster recovery, and so on. In general, data replication and virtual synthesis techniques can be used to avoid the transmission of duplicate data. In addition, parallel data transmission can also be used to increase the transmission speed. The parallel data transmission refers to making full use of network bandwidth by dividing to-be-transmitted data into several slices and establishing a plurality of streams for transmitting the slices in parallel.

SUMMARY

Embodiments of the present disclosure provide a method, a device, and a computer program product for parallel data transmission, which can select an appropriate number of concurrencies and data slice size for use in a period of parallel data transmission according to attributes of data to be transmitted in an actual scenario and an actual network condition, thus increasing the speed of parallel data transmission.

In one aspect of the present disclosure, a method for parallel data transmission is provided. The method includes: obtaining attributes of data to be transmitted from a first storage device to a second storage device and a network condition between the first storage device and the second storage device; determining a number of concurrencies and a data slice size for use in parallel transmission of the data based on the attributes of the data and the network condition; and transmitting the data in parallel between the first storage device and the second storage device based on the number of concurrencies and the data slice size.

In another aspect of the present disclosure, a device for parallel data transmission is provided. The device includes a processing unit and a memory, wherein the memory is coupled to the processing unit and stores instructions. When the instructions are executed by the processing unit, the following operations are implemented: obtaining attributes of data to be transmitted from a first storage device to a second storage device and a network condition between the first storage device and the second storage device; determining a number of concurrencies and a data slice size for use in parallel transmission of the data based on the attributes of the data and the network condition; and transmitting the data in parallel between the first storage device and the second storage device based on the number of concurrencies and the data slice size.

In still another aspect of the present disclosure, a computer program product is provided. The computer program product is tangibly stored in a non-transitory computer readable medium and includes computer executable instructions. When executed, the computer executable instructions cause a computer to perform a method or process according to an embodiment of the present disclosure.

The summary of the invention is provided to introduce a selection of concepts in a simplified form, and the concepts are further described below in the detailed description. The summary of the invention is not intended to identify key features or essential features of the present disclosure, and is not intended to limit the scope of the various embodiments of the present disclosure.

BRIEF DESCRIPTION OF THE DRAWINGS

The above and other objectives, features, and advantages of the present disclosure will become more apparent from the more detailed description of exemplary embodiments of the present disclosure with reference to accompanying drawings. In the exemplary embodiments of the present disclosure, like reference numerals generally represent like elements.

DETAILED DESCRIPTION

Figure 1:
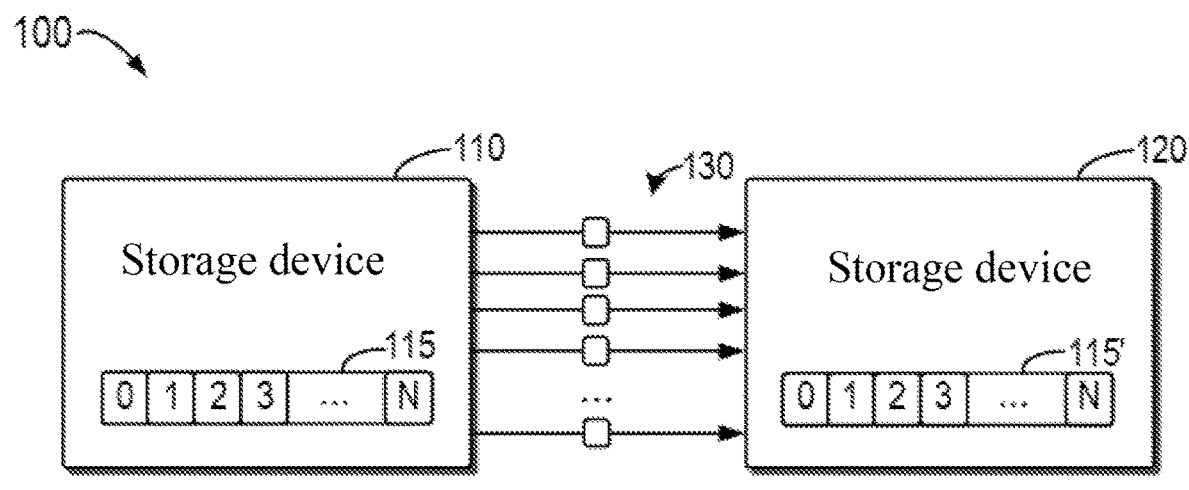
FIG. 1 is a schematic diagram of an environment for parallel data transmission according to an embodiment of the present disclosure.

Preferred embodiments of the present disclosure will be described in more detail below with reference to the accompanying drawings. Some specific embodiments of the present disclosure have been shown in the accompanying drawings. However, it should be understood that the present disclosure can be implemented in various forms rather than being limited by the embodiments described here. In contrast, the embodiments are provided so that the present disclosure becomes more thorough and complete, and the scope of the present disclosure can be fully conveyed to those skilled in the art.

The term "include" and its variants used herein indicate open-ended inclusion, i.e., "including, but not limited to." Unless specifically stated otherwise, the term "or" indicates "and/or." The term "based on" indicates "based at least in part on." The terms "an exemplary embodiment" and "an embodiment" indicate "at least one exemplary embodiment." The term "another embodiment" indicates "at least one additional embodiment." The terms "first," "second" and the like may refer to different or identical objects, unless a difference is clearly indicated.

The inventors of this application found that two key factors affecting the speed of parallel data transmission are the number of concurrencies for parallel streaming and the size of data slices into which the data is divided. Selection of different values for the two key factors may have a significant impact on the transmission performance. However, there is currently no intelligent and accurate method for selecting an appropriate number of concurrencies and data slice size in a particular scenario.

Traditionally, there are mainly two methods for determining the number of concurrencies and the data slice size in parallel data transmission. One method is using a fixed rule, in which the number of concurrencies and the data slice size are set based on some human experience. However, the human experience may be inaccurate in some scenarios and cannot cover all situations in actual scenarios. Another method is comparing the similarity between a current scenario and historical scenarios. However, this method requires a very large amount of historical data, and may lead to erroneous conclusions for situations that have not occurred in history. Therefore, the traditional methods cannot accurately determine the number of concurrencies and the data slice size used in the parallel data transmission.

Therefore, the embodiments of the present disclosure propose a new solution for determining the number of concurrencies and the data slice size used in parallel data transmission. In the embodiments of the present disclosure, during parallel data transmission, a correct and appropriate number of concurrencies and data slice size can be selected according to attributes of data to be transmitted and an actual network condition in an actual scenario, thereby improving the speed of parallel data transmission.

Basic principles and several exemplary implementations of the present disclosure are described below with reference to FIG. 1 to FIG. 6. It should be understood that the exemplary embodiments are provided merely to help those skilled in the art to better understand and further implement the embodiments of the present disclosure, rather than to limit the scope of the present disclosure in any way.

FIG. 1 is a schematic diagram of an environment 100 for parallel data transmission according to an embodiment of the present disclosure. As shown in FIG. 1, the environment 100 includes two storage devices 110 and 120, which may be connected through a network. For example, the storage devices 110 and 120 can be two data storage systems or two backup servers. At some point, for the purpose of data backup, data 115 in the storage device 110 needs to be transmitted to the storage device 120 as, for example, data 115'. To speed up the transmission of the data 115 from the storage device 110 to the storage device 120, the data 115 can be divided into a plurality of data slices (e.g., as shown in FIG. 1, the data slices are labeled 0, 1, 2, 3 . . . N). The data is transmitted in parallel through a plurality of concurrent channels, as indicated by arrows 130. The embodiments of the present disclosure propose an intelligent method for selecting a number of concurrencies and a data slice size for a parallel data protection solution. In the embodiments of the present disclosure, a data generation tool is created to generate test data sets having different data attributes and network conditions, and a decision tree is trained based on the generated test data set. In addition, in some embodiments of the present disclosure, incremental online induction of the decision tree is also supported.

In general, data deduplication and virtual synthesis technologies can increase the efficiency of data transmission. With the data deduplication technology, raw data is divided into fixed or variable blocks represented by hash values, and a block decomposition algorithm ensures that the same data block always produces the same hash value. If the same data block has been transmitted and stored, there is no need to transmit the data block, thereby reducing data transmitted over the network and reducing the capacity consumed by the storage.

The data deduplication works using data blocks as units, and the data block can be a small unit (e.g., 24 KB). However, the data deduplication needs to occupy computing resources of a backup/replication client/server, and the overheads may be high in the case of a large data amount. This problem can be solved by introducing virtual synthesis. For files that have been backed up to a storage device, the data will not be deduplicated at all for subsequent backup/copy sessions. Instead, the offset and length of these files in the storage device are recorded in a high-speed cache. Therefore, it is only necessary to virtually synthesize the content from the previous backup to a new backup. In a scenario where some data is already backed up to the storage device and the number of files is relatively large while the portion of changed files is relatively small, the virtual synthesis technology can reduce the computational overheads of the backup/replication client/server for deleting the duplicated data. In addition to data deduplication and virtual synthesis, selecting an appropriate number of concurrencies and data slice size during parallel data transmission can also increase the efficiency of data transmission, as described in the exemplary implementation below.

Figure 2:
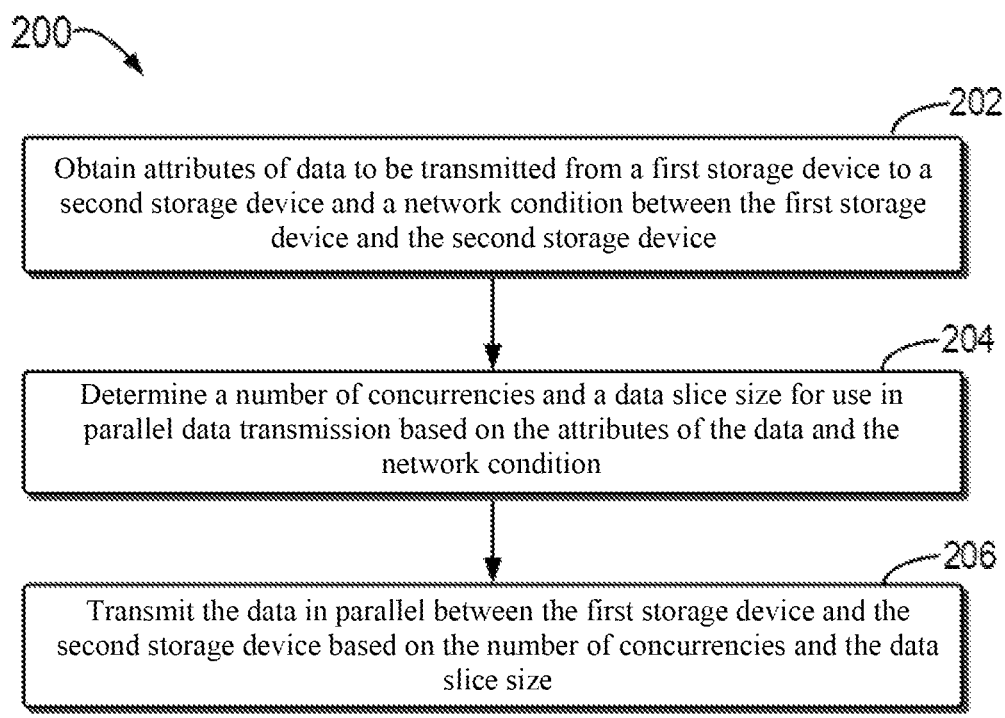
FIG. 2 is a flowchart of a method for parallel data transmission according to an embodiment of the present disclosure.

FIG. 2 is a flowchart of a method 200 for parallel data transmission according to an embodiment of the present disclosure. The method 200 may be performed, for example, by the storage device 110 as described with reference to FIG. 1, or by a device other than the storage devices 110 and 120.

In 202, attributes of data to be transmitted from a first storage device to a second storage device and a network condition between the first storage device and the second storage device are obtained. For example, when preparing to transmit data 115 from the storage device 110 to the storage device 120 in parallel, attributes (such as the size) of the transmitted data 115 are first obtained, and a network environment condition between the storage device 110 and the storage device 120 is also obtained.

In some embodiments, the data attributes may include the size of the data, the number of files in the data, a proportion of incremental data in the data, and discreteness of the incremental data, wherein the discreteness includes an average region size, a minimum region size, a maximum region size, and the total number of regions of the incremental data. In some embodiments, the network condition may include a network bandwidth, a network delay, and the like. In some embodiments, in addition to the data attributes and the network condition, hardware capabilities of the storage device, such as the size of the memory, the number of cores of the processor, and the like, may be obtained.

In 204, a number of concurrencies and a data slice size for use in parallel data transmission are determined based on the attributes of the data and the network condition. For example, a trained machine learning model (e.g., a decision tree model) according to an embodiment of the present disclosure can output an appropriate number of concurrencies and data slice size suitable for a current transmission scenario according to the obtained data attributes and network condition.

In 206, the data is transmitted in parallel between the first storage device and the second storage device based on the number of concurrencies and the data slice size. For example, the data can be sliced into a plurality of data slices based on the data slice size, and then the data slices are backed up in parallel from the first storage device to the second storage device. Therefore, in an embodiment of the present disclosure, during parallel data transmission, the appropriate number of concurrencies and data slice size can be selected according to the attributes of the data to be transmitted in the actual scenario and the actual network condition, thereby improving the speed of parallel data transmission.

Figure 3:
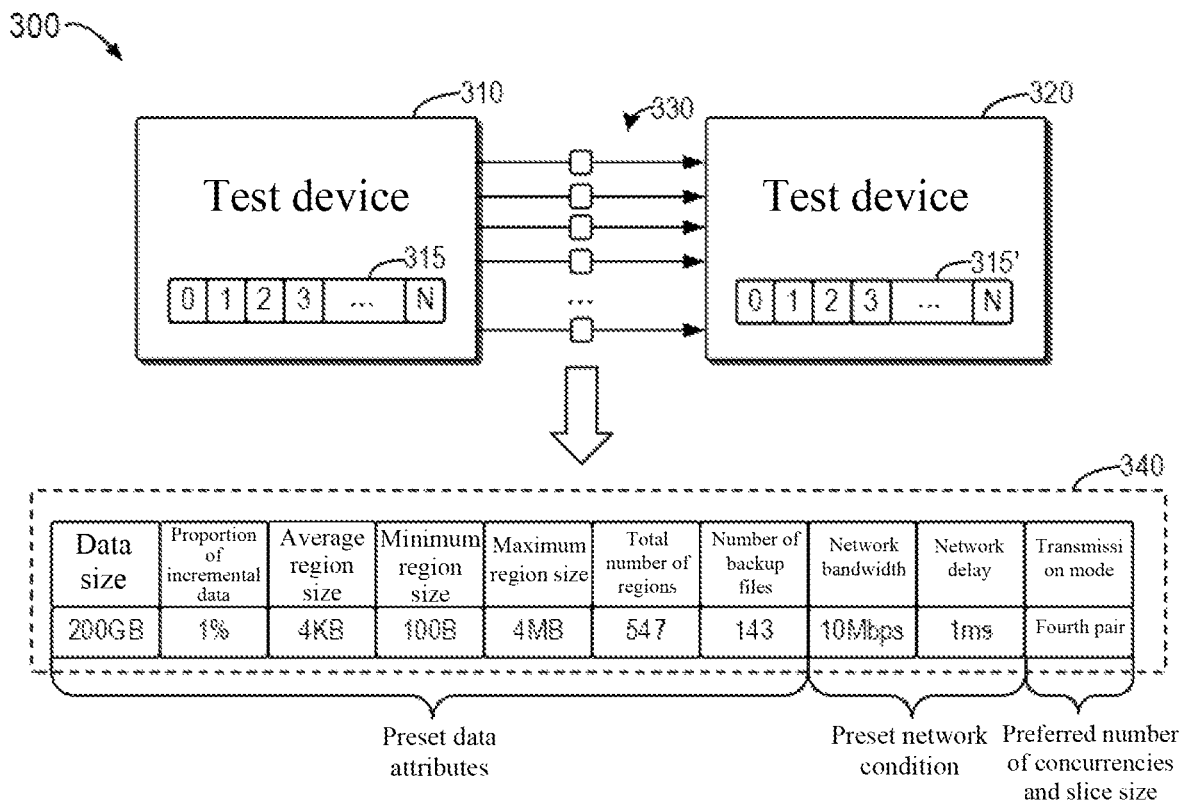
FIG. 3 is a schematic diagram of a process of generating test data by using test devices according to an embodiment of the present disclosure.

FIG. 3 is a schematic diagram of a process 300 of generating test data by using test devices in a laboratory according to an embodiment of the present disclosure. As shown in FIG. 3, at least two test devices 310 and 320 are included in the lab, and the parallel transmission of data 315 between the test device 310 and the test device 320 (as shown by arrows 330) can be tested using different data attributes and network conditions, to generate a test data set by simulation. The generated test data set is then used to train the machine learning model. As shown in FIG. 3, test data 340 may be a data item in the test data set, and includes artificially set data attributes, artificially set network conditions, and preferred transmission modes determined by testing (which indicate the preferred number of concurrencies and slice size).

In some embodiments, test data sets related to parallel data transmission can be generated on a laboratory test device using different data attributes and network conditions. For example, a data replication scenario may be selected to generate test data. Replication between backup servers involves larger amounts of data than backup on a lightweight client, and therefore, it is appropriate to use both the number of concurrencies and the data slice size to test the transmission performance. Two or more objects are involved during data replication. For example, there can be two physical servers, and data is transmitted directly from one server to another.

Many factors can affect the performance of parallel data transmission during the replication process. For modern data replication technologies, the factors that affect the performance may be data type, device type, data structure, and/or data size. For a data storage system that allows incremental backup, backup after the first backup does not process all the data, and only newly added data after modification is sent to the storage system. The unmodified part will be linked to the current backup by a synthesis technology. Therefore, new data is also an important factor during incremental backup replication. In addition, a network between replication devices will also affect the replication. Therefore, in some embodiments of the present disclosure, the optimal number of concurrencies and data slice size may be determined according to the following parameters: the data size, the proportion of incremental data, the average region size, the minimum region size, the maximum region size, the total number of regions, the number of backup files, the network bandwidth, and the network delay (such as a network round-trip time (RTT)).

A data generation tool can be created to generate a historical data set that covers most replication situations. The data generation tool can perform a plurality of actual data replications using different parameter values. Before running the data generation tool, it is necessary to specify parameter value ranges and value increment intervals, as shown in Table 1 below.

TABLE 1

Example of Test Data Ranges

| Parameter | Value range | Interval |
|---|---|---|
| Data size | 20 KB-12 TB | 100 MB |
| Proportion of incremental data | 1%-70% | 2% |
| Average region size | 4 KB-40 MB | 10 KB |
| Minimum region size | 100 B-40 MB | 10 KB |
| Maximum region size | 100 B-40 MB | 10 KB |
| Total number of regions | $1-2^{32}$ | 10 |
| Number of backup files | $1-2^{64}$ | 100 |
| Network bandwidth | 10 Mbps-10 Gbps | 100 Mbps |
| Network delay | 1 ms-200 ms | 20 ms |

Based on the test ranges preset in Table 1, the data generation tool traverses the parameter values one by one, and uses a predefined {number of concurrencies, data slice size} pair to actually duplicate data between two test devices to obtain an execution result. The execution result includes an "execution time" and "bytes sent over network." For each round, execution results of different {number of concurrencies, data slice size} pairs are compared, and a {number of concurrencies, data slice size} pair with the minimum "running time" is selected as the optimal {number of concurrencies, data slice size} pair. For example, Table 2 shows a given test parameter.

TABLE 2

Example of Given Test Parameters

| Parameter | Interval |
|---|---|
| Data size | 200 GB |
| Proportion of incremental data | 1% |
| Average region size | 4 KB |
| Minimum region size | 100 B |
| Maximum region size | 4 MB |
| Total number of regions | 547 |
| Number of backup files | 143 |
| Network bandwidth | 10 Mbps |
| Network delay | 1 ms |

For the given test parameters in Table 2, a plurality of rounds of data replication tests can be performed using a plurality of {number of concurrencies, data slice size} pairs. The test results are shown in Table 3 below. The fourth pair takes the least execution time, so the fourth pair can be considered as the appropriate data transmission mode for the given test parameter described above.

TABLE 3

Examples of Test Results for Different Pairs

| Data transmission mode | Execution time | Bytes sent over network | Final solution |
|---|---|---|---|
| First {number of concurrencies, data slice size} pair | 0000h:05m:29s | 1,498,638,048 (1.396 GB) | |
| Second {number of concurrencies, data slice size} pair | 0000h:03m:14s | 10,867,267,796 (10.12 GB) | |
| Third {number of concurrencies, data slice size} pair | 0000h:06m:10s | 5,949,861,888 (5.541 GB) | |
| Fourth {number of concurrencies, data slice size} pair | 0000h:02m:47s | 4,718,062,572 (4.394 GB) | √ |

The data generation tool records the test results in Table 3 as the prior knowledge of decision tree learning, which includes 9-dimensional input and 1-dimensional output, as shown in Table 4 below. The test data is used as the prior knowledge to train the decision tree model.

TABLE 4

Examples of Test Data Sets

| Data size | Proportion of incremental data | Average region size | Minimum region size | Maximum region size | Total number of regions | Number of backup files | Network bandwidth | Network delay | Transmission mode |
|---|---|---|---|---|---|---|---|---|---|
| 100 GB | 1% | 4 KB | 100 B | 100 B | 1 | 1 | 10 Mbps | 1 ms | Fourth pair |
| 200 GB | 2% | 8 KB | 10 KB | 1 MB | 4 | 5 | 100 Mbps | 10 ms | Second pair |
| 300 GB | 3% | 12 KB | 30 B | 2 MB | 8 | 23 | 200 Mbps | 20 ms | Third pair |
| 400 GB | 4% | 16 KB | 50 B | 3 MB | 34 | 67 | 300 Mbps | 30 ms | Fourth pair |
| 500 GB | 5% | 20 KB | 1 MB | 4 MB | 73 | 74 | 800 Mbps | 40 ms | First pair |
| 600 GB | 6% | 24 KB | 4 MB | 8 MB | 234 | 843 | 1 Gbps | 50 ms | Second pair |
| ... | ... | ... | ... | ... | ... | ... | ... | ... | ... |

According to an embodiment of the present disclosure, after a test data set for parallel data transmission is generated, a machine learning model may be trained using some machine learning algorithms, for determining a transmission mode (which includes a number of concurrencies and a data slice size) in an actual scenario. In order to construct an attribute-based self-learning induction knowledge acquisition system, a machine learning-related algorithm can be used to dynamically create a classification model to represent the prior knowledge and assist in classification when new data enters. According to some embodiments of the present disclosure, the machine learning model needs to meet the following two aspects: solving the multivariate system classification problem by supervised learning; and supporting incremental learning for new training data to be obtained.

For example, to support the incremental induction of knowledge, a neural network structure can be constructed using the artificial neural network algorithm library Learn++, and the weight of the neural network is updated dynamically and incrementally. Learn++ is an algorithm for training a neural network mode classifier incrementally. The algorithm does not require access to previously used data during subsequent incremental learning sessions, but also it will not forget the previously acquired knowledge. Alternatively, an incremental support vector machine (SVM) algorithm, which is an online recursive algorithm, can also be used. The online incremental support vector machine algorithm focuses on the design and analysis of efficient incremental SVM learning, and can provide a fast, stable, and robust classification function.

In some embodiments of the present disclosure, a decision tree model may be used as a machine learning model. A decision tree is a flowchart-like structure, in which each internal node represents a "test" for an attribute, each branch represents the result of the test, and each leaf node represents a class label (a decision made after all attributes are calculated). A path from the root to a leaf represents a classification rule. In decision analysis, the decision tree and a closely related influence diagram are used as visual and analytical decision support tools. The decision tree is often used in decision analysis to help determine the target most likely to be achieved, and is also a strategy of a popular tool in machine learning.

The ID3 algorithm is a decision tree algorithm. Each training instance is described as a list of attribute-value pairs that constitute a joint description of the instance. This instance is labeled with a name of a class it belongs to. To simplify discussion, it is assumed that an instance belongs to one of two classes: a positive instance, which is an example of a concept to be learned (a target concept); and a negative instance, which is a counterexample of the target concept. The ID3 algorithm can be applied to more than two classes directly. In addition, it is assumed that the attribute has a discrete value. The ID3 is a useful concept learning algorithm because it can effectively build a well-promoted decision tree. For a non-incremental learning task, the ID3 algorithm is usually a good choice for building a classification rule.

However, for an incremental learning task, it is better to gradually accept instances without having to build a new decision tree each time. The ID4 algorithm is a step-by-step learning decision tree that supports incremental learning. A mechanism in the ID4 algorithm for determining when to change the attribute test at a node is included in a new algorithm ID5R, which guarantees that for a given training instance set, a same decision tree as that in the ID3 algorithm is constructed. However, like the ID4 algorithm, the ID5R algorithm cannot handle numeric attributes and more than two valuable attributes.

Thus, in some embodiments of the present disclosure, a decision tree may be constructed using a very fast decision tree (VFDT). The VFDT is a decision tree learning system based on a Hoeffding tree. The Hoeffding tree can be learned at a constant time of each instance, and the storage limitations of traditional decision tree learners (such as ID3, C4.5, and SLIQ) can be overcome by using a Hoeffding boundary. Word boundaries are used to determine how many instances each internal node of the decision tree needs, in order to make statistically important decisions on how to split nodes. A good feature of the Hoeffding boundary is that it is independent of the probability distribution of the original data set, which in turn means that more observations are needed to reach the same conclusion as a distribution dependent method. A key feature of the Hoeffding boundary is that it ensures with high probability that a selected attribute is the same as an attribute that would have been selected using an infinite number of instances. The VFDT can process tens of thousands of instances per second using existing hardware. Thus, the VFDT algorithm is used to train a Hoeffding tree for use as a decision tree mode in the embodiments of the present disclosure. It should be understood that any known or future improved VFDT or Hoeffding tree-related algorithm may be used in conjunction with the embodiments of the present disclosure.

Figure 4:
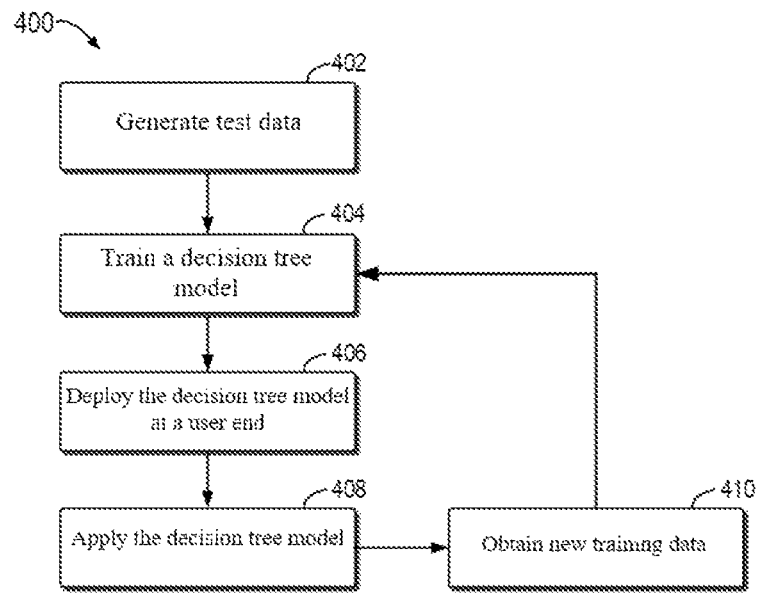
FIG. 4 is a flowchart of a method for training a decision tree model according to an embodiment of the present disclosure.

FIG. 4 is a flowchart of a method 400 for training a decision tree model according to an embodiment of the present disclosure. As shown in FIG. 4, in 402, a test data set is generated using different data attributes and network conditions in a lab, and in 404, a decision tree model is trained using the test data set. After completing the training of the decision tree, in 406, the trained decision tree model is deployed at a client of a storage device and/or storage system, and then in 408, the appropriate number of concurrencies and data slice size are recommended to a user during parallel data transmission of the storage system.

In 410, new training data is obtained. The test data set generated from the lab may be incapable of covering the complete actual scenario because testing is used at intervals. Although the decision tree model can generate an optimal solution for various scenarios due to its generalization ability, the recommended solution may not be the real optimal solution. Therefore, in the actual parallel data transmission process, if a user selects a solution different from the solution recommended by the decision tree model (different number of concurrencies and data slice size) for some reason, and the solution selected by the user has a better effect (for example, the processing speed is faster), features of the user-selected solution (such as the number of concurrencies and the data slice size) can be collected and used as new training data. Then, in 404, the decision tree model is incrementally trained (complete repetitive training is not required), that is, the user-selected solution data is used as a learning sample to participate in the next round of decision tree model training. In some embodiments, a Hoeffding tree suitable for big data incremental learning may be used as a decision tree model. In this way, the accuracy of the trained decision tree model can be further improved.

Figure 5:
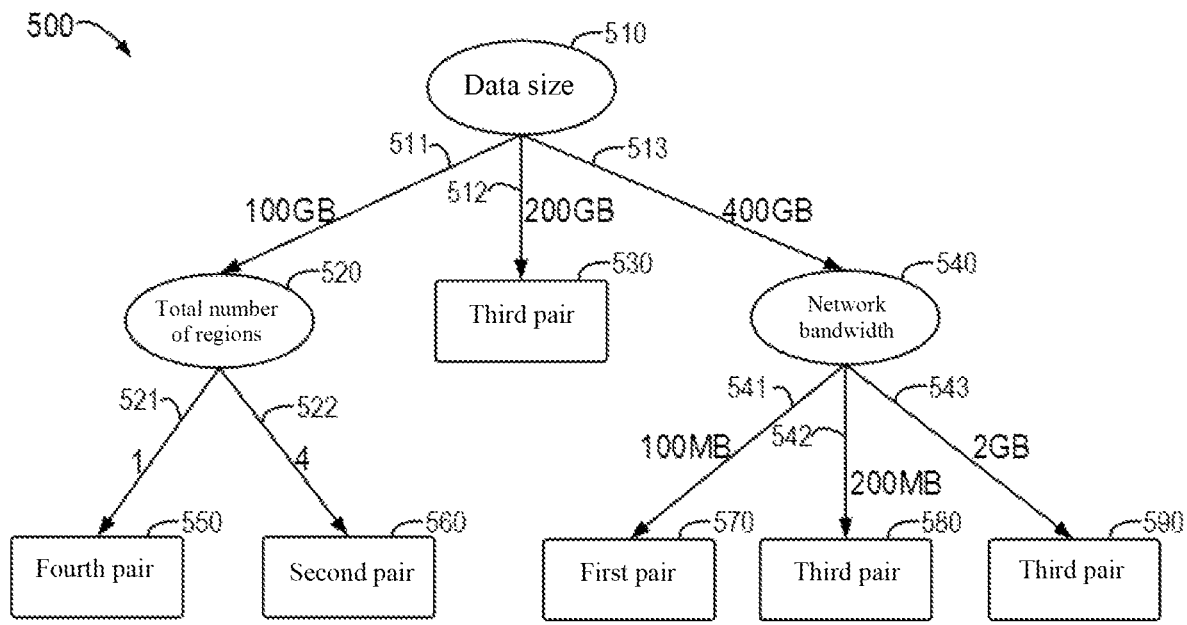
FIG. 5 is a schematic diagram of a portion of an exemplary decision tree model according to an embodiment of the present disclosure.

FIG. 5 is a schematic diagram of a portion of an exemplary decision tree model 500 according to an embodiment of the present disclosure. For example, the decision tree model 500 is a classification model that is generated by automatic learning based on a test data set using a VFDT algorithm. In the example of FIG. 5, a root node 510 is, for example, a data attribute "data size." If the size of data to be transmitted in parallel is 100 GB, it is necessary to further determine the total number of regions, as indicated by an edge 511. If the data size is 200 GB, the third pair 530 of a number of concurrencies and a data slice size is directly selected, as indicated by an edge 512. If the data size is 400 GB, the size of the network bandwidth needs to be further determined, as indicated by an edge 513.

At a child node 520, if the total number of regions of incremental data to be transmitted in parallel is 1, the fourth pair 550 of a number of concurrencies and a data slice size is selected, as indicated by an edge 521. If the total number of regions of incremental data to be transmitted in parallel is 4, the second pair 560 of a number of concurrencies and a data slice size is selected, as indicated by an edge 522. Similarly, at a child node 540, if the current network bandwidth is 100 MB, the first pair 570 of a number of concurrencies and a data slice size is selected, as indicated by an edge 541. If the current network bandwidth is 200 MB, the third pair 580 of a number of concurrencies and a data slice size is selected, as indicated by an edge 542. If the current network bandwidth is 2 GB, the third pair 590 of a number of concurrencies and a data slice size is selected, as indicated by an edge 543.

It should be understood that only a portion of the exemplary decision tree model is shown in FIG. 5, and the actual decision tree model further includes more nodes and edges or different nodes and edges. Further, although the judgment condition of the edge of the exemplary decision tree model 500 in FIG. 5 is a fixed value, the judgment condition may also be a range. For example, the edge 512 may represent a range greater than 100 GB and less than or equal to 200 GB, or the like.

After the decision tree model 500 is generated by training, for a new parallel data transmission scenario, the decision tree model 500 can automatically determine and recommend the appropriate number of concurrencies and data slice size according to the obtained data attributes and network condition (even if they are new data that has not appeared in the test data). Therefore, in an embodiment of the present disclosure, during parallel data transmission, the appropriate number of concurrencies and data slice size can be selected according to the attributes of the data to be transmitted in the actual scenario and an actual network condition, thereby improving the speed of parallel data transmission.

Figure 6:
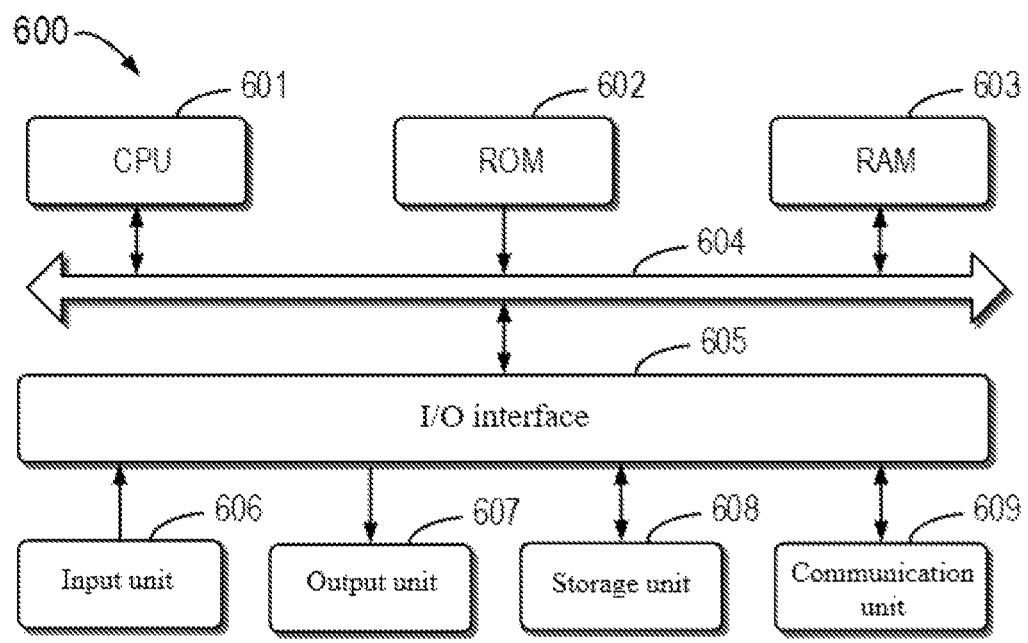
FIG. 6 is a schematic block diagram of a device that can be configured to implement an embodiment of the present disclosure.

FIG. 6 is a schematic block diagram of a device 600 that may be configured to implement an embodiment of the present disclosure. The device 600 may be a device or an apparatus described in an embodiment of the present disclosure. As shown in FIG. 6, the device 600 includes a central processing unit (CPU) 601 that can perform various appropriate operations and processes according to computer program instructions stored in a read-only memory (ROM) 602 or computer program instructions loaded from a storage unit 608 to a random access memory (RAM) 603. In the RAM 603, various programs and data required for the operation of the device 600 can also be stored. The CPU 601, the ROM 602, and the RAM 603 are connected to each other through a bus 604. An input/output (I/O) interface 605 is also coupled to the bus 604.

A plurality of components in the device 600 are coupled to the I/O interface 605, including: an input unit 606, such as a keyboard and a mouse; an output unit 607, such as various types of displays and speakers; a storage unit 608, such as a magnetic disk and an optical disc; and a communication unit 609, such as a network card, a modem, and a wireless communication transceiver. The communication unit 609 allows the device 600 to exchange information/data with other devices over a computer network such as the Internet and/or various telecommunication networks.

The various methods or processes described above may be performed by the processing unit 601. For example, in some embodiments, the method can be implemented as a computer software program that is tangibly included in a machine readable medium, such as the storage unit 608. In some embodiments, some or all of the computer program can be loaded and/or installed onto the device 600 via the ROM 602 and/or the communication unit 609. When the computer program is loaded into the RAM 603 and executed by the CPU 601, one or more of the steps or operations of the method or process described above may be implemented.

In some embodiments, the method and process described above can be implemented as a computer program product. The computer program product can include a computer readable storage medium loaded with computer readable program instructions for implementing various aspects of the present disclosure.

The computer readable storage medium may be a tangible device that can retain and store instructions used by an instruction execution device. The computer readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer readable storage medium include: a portable computer disk, a hard disk, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punched card or in-groove protruding structures with instructions stored thereon, and any suitable combination thereof. The computer readable storage medium used herein is not to be interpreted as a transient signal itself, such as a radio wave or other freely propagating electromagnetic waves, an electromagnetic wave propagating through a waveguide or another transmission medium (e.g., an optical pulse through a fiber optic cable), or an electrical signal transmitted through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include a copper transmission cable, fiber optic transmission, wireless transmission, a router, a firewall, a switch, a gateway computer, and/or an edge server. A network adapter card or network interface in each computing/processing device receives computer readable program instructions from the network and forwards the computer readable program instructions for storage in a computer readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages as well as conventional procedural programming languages. The computer readable program instructions can be executed entirely on a user computer, partly on the user computer, as a stand-alone software package, partly on the user computer and partly on a remote computer, or entirely on the remote computer or a server. In the case where a remote computer is involved, the remote computer can be connected to a user computer through any kind of network, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), can be customized by utilizing state information of the computer readable program instructions. The computer readable program instructions are executable by the electronic circuit to implement various aspects of the present disclosure.

The computer readable program instructions can be provided to a processing unit of a general purpose computer, a special purpose computer or another programmable data processing apparatus to produce a machine such that the instructions, when executed by the processing unit of the computer or another programmable data processing apparatus, generate an apparatus for implementing the functions/operations specified in one or more blocks in the flowchart and/or block diagram. The computer readable program instructions can also be stored in a computer readable storage medium, and cause the computer, the programmable data processing device, and/or another device to operate in a particular manner, such that the computer readable medium storing the instructions includes a manufactured product including instructions for implementing various aspects of the functions/operations specified in one or more blocks in the flowchart and/or block diagram.

The computer readable program instructions may also be loaded onto a computer, another programmable data processing device, or another device such that a series of operational steps are performed on the computer, another programmable data processing device or another device to produce a computer implemented process. As such, the instructions executed on the computer, another programmable data processing apparatus, or another device implement the functions/operations specified in one or more blocks in the flowchart and/or block diagram.

The flowchart and block diagram in the accompanying drawings illustrate the architecture, functions, and operations of possible implementations of devices, methods, and computer program products according to multiple embodiments of the present disclosure. In this regard, each block in the flowchart or block diagram can represent a module, a program segment, or a part of instructions that includes one or more executable instructions for implementing the specified logical functions. In some alternative implementations, the functions noted in the blocks may also occur in an order different from that illustrated in the drawings. For example, two consecutive blocks may in fact be executed substantially in parallel, and they may sometimes be executed in a reverse order, depending upon the functions involved. It should also be noted that each block in the block diagram and/or flowchart, and a combination of blocks in the block diagram and/or flowchart can be implemented by a dedicated hardware-based system that performs the specified functions or operations, or can be implemented by a combination of dedicated hardware and computer instructions.

The embodiments of the present disclosure have been described above, and the foregoing description is illustrative rather than exhaustive, and is not limited to the disclosed embodiments. Numerous modifications and changes are apparent to those of ordinary skill in the art without departing from the scope and spirit of various illustrated embodiments. The selection of terms used herein is intended to best explain the principles and practical applications of the various embodiments, or technical improvements of the technologies on the market, or to enable other persons of ordinary skill in the art to understand the embodiments disclosed here.

What is claimed is:

1. A method for parallel data transmission, comprising:
obtaining attributes of data to be transmitted from a first storage device to a second storage device and a network condition between the first storage device and the second storage device;
determining a number of concurrencies and a data slice size for use in parallel transmission of the data based on the attributes of the data and the network condition; and
transmitting the data in parallel between the first storage device and the second storage device based on the number of concurrencies and the data slice size;
wherein determining the number of concurrencies and the data slice size for use in parallel transmission of the data based on the attributes of the data and the network condition comprises applying the attributes of the data and the network condition to a machine learning model trained utilizing results of one or more test parallel data transmissions each using at least one of a different number of concurrencies and a different data slice size.

2. The method according to claim 1, wherein obtaining the attributes of the data comprises:
obtaining at least one of a size of the data, a number of files in the data, a proportion of incremental data in the data, and discreteness of the incremental data, wherein the discreteness comprises an average region size, a minimum region size, a maximum region size, and a total number of regions of the incremental data.

3. The method according to claim 1, wherein obtaining the network condition comprises:
obtaining at least one of a network bandwidth and a network delay between the first storage device and the second storage device.

4. The method according to claim 1, wherein the number of concurrencies and the data slice size are determined by the machine learning model, and the method further comprises:
executing parallel data transmission between a third storage device and a fourth storage device using a different data attribute and a different network condition, wherein the third storage device and the fourth storage device are test devices;
generating a test data set based on the parallel data transmission between the third storage device and the fourth storage device; and
training the machine learning model by using the generated test data set.

5. The method according to claim 4, wherein generating the test data comprises:
executing, for a given data attribute and a given network condition, a plurality of parallel data transmissions using a plurality of pairs of numbers of concurrencies and data slice sizes respectively;
recording an execution time for completing the parallel data transmission using each pair of a number of concurrencies and a data slice size among the plurality of pairs of numbers of concurrencies and data slice sizes;
determining a pair of a number of concurrencies and a data slice size having the least execution time among the plurality of pairs of numbers of concurrencies and data slice sizes as an optimal number of concurrencies and data slice size; and
storing the optimal number of concurrencies and data slice size as well as the given data attribute and the given network condition in the test data set in an associated manner.

6. The method according to claim 5, wherein training the machine learning model by using the generated test data set comprises:
training, by using the generated test data set, a decision tree model for determining the number of concurrencies and the data slice in the parallel data transmission.

7. The method according to claim 6, further comprising:
deploying the trained decision tree model in a storage system;
collecting user-selected solutions that are better than a recommended solution of the decision tree model as new training data; and
training the decision tree model incrementally by using the new training data.

8. The method according to claim 1, wherein transmitting the data in parallel between the first storage device and the second storage device comprises:
slicing the data into a plurality of data slices based on the data slice size; and
backing up the plurality of data slices from the first storage device to the second storage device based on the number of concurrencies.

9. A device for parallel data transmission, comprising:
a processing unit; and
a memory coupled to the processing unit and storing instructions for implementing the following operations when executed by the processing unit:
obtaining attributes of data to be transmitted from a first storage device to a second storage device and a network condition between the first storage device and the second storage device;
determining a number of concurrencies and a data slice size for use in parallel transmission of the data based on the attributes of the data and the network condition; and
transmitting the data in parallel between the first storage device and the second storage device based on the number of concurrencies and the data slice size;
wherein determining the number of concurrencies and the data slice size for use in parallel transmission of the data based on the attributes of the data and the network condition comprises applying the attributes of the data and the network condition to a machine learning model trained utilizing results of one or more test parallel data transmissions each using at least one of a different number of concurrencies and a different data slice size.

10. The device according to claim 9, wherein obtaining the attributes of the data comprises:
obtaining at least one of a size of the data, a number of files in the data, a proportion of incremental data in the data, and discreteness of the incremental data, wherein the discreteness comprises an average region size, a minimum region size, a maximum region size, and a total number of regions of the incremental data.

11. The device according to claim 9, wherein obtaining the network condition comprises:
obtaining at least one of a network bandwidth and a network delay between the first storage device and the second storage device.

12. The device according to claim 9, wherein the number of concurrencies and the data slice size are determined by the machine learning model, and the operations further comprise:
executing parallel data transmission between a third storage device and a fourth storage device using a different data attribute and a different network condition, wherein the third storage device and the fourth storage device are test devices;
generating a test data set based on the parallel data transmission between the third storage device and the fourth storage device; and
training the machine learning model by using the generated test data set.

13. The device according to claim 12, wherein generating the test data comprises:
executing, for a given data attribute and a given network condition, a plurality of parallel data transmissions using a plurality of pairs of numbers of concurrencies and data slice sizes respectively;
recording an execution time for completing the parallel data transmission using each pair of a number of concurrencies and a data slice size among the plurality of pairs of numbers of concurrencies and data slice sizes;
determining a pair of a number of concurrencies and a data slice size having the least execution time among the plurality of pairs of numbers of concurrencies and data slice sizes as an optimal number of concurrencies and data slice size; and
storing the optimal number of concurrencies and data slice size as well as the given data attribute and the given network condition in the test data set in an associated manner.

14. The device according to claim 13, wherein training the machine learning model by using the generated test data set comprises:
training, by using the generated test data set, a decision tree model for determining the number of concurrencies and the data slice in the parallel data transmission.

15. The device according to claim 14, wherein the operations further comprise:
deploying the trained decision tree model in a storage system;
collecting user-selected solutions that are better than a recommended solution of the decision tree model as new training data; and
training the decision tree model incrementally by using the new training data.

16. The device according to claim 9, wherein transmitting the data in parallel between the first storage device and the second storage device comprises:
slicing the data into a plurality of data slices based on the data slice size; and
backing up the plurality of data slices from the first storage device to the second storage device based on the number of concurrencies.

17. A computer program product, tangibly stored in a non-transitory computer readable medium and comprising computer executable instructions, wherein when executed, the computer executable instructions cause a computer to perform a method for parallel data transmission, comprising:
obtaining attributes of data to be transmitted from a first storage device to a second storage device and a network condition between the first storage device and the second storage device;
determining a number of concurrencies and a data slice size for use in parallel transmission of the data based on the attributes of the data and the network condition; and
transmitting the data in parallel between the first storage device and the second storage device based on the number of concurrencies and the data slice size;
wherein determining the number of concurrencies and the data slice size for use in parallel transmission of the data based on the attributes of the data and the network condition comprises applying the attributes of the data and the network condition to a machine learning model trained utilizing results of one or more test parallel data transmissions each using at least one of a different number of concurrencies and a different data slice size.

18. The computer program product of claim 17, wherein obtaining the attributes of the data comprises:
obtaining at least one of a size of the data, a number of files in the data, a proportion of incremental data in the data, and discreteness of the incremental data, wherein the discreteness comprises an average region size, a minimum region size, a maximum region size, and a total number of regions of the incremental data.

19. The computer program product of claim 17, wherein obtaining the network condition comprises:
obtaining at least one of a network bandwidth and a network delay between the first storage device and the second storage device.

20. The computer program product of claim 17, wherein the number of concurrencies and the data slice size are determined by the machine learning model, and the method further comprises:
executing parallel data transmission between a third storage device and a fourth storage device using a different data attribute and a different network condition, wherein the third storage device and the fourth storage device are test devices;
generating a test data set based on the parallel data transmission between the third storage device and the fourth storage device; and
training the machine learning model by using the generated test data set.

* * * * *